Oct. 15, 1968   G. GEIER ETAL   3,406,292
SURFACE CHECKING DEVICE
Original Filed July 17, 1961   3 Sheets-Sheet 1

INVENTORS
GEORGE GEIER
BY CHARLES R. ELLIS
ALLISTER L. BAKER

J. Russell Juten
ATTORNEY

Oct. 15, 1968  G. GEIER ETAL  3,406,292
SURFACE CHECKING DEVICE
Original Filed July 17, 1961  3 Sheets-Sheet 2

INVENTORS
GEORGE GEIER
BY CHARLES R. ELLIS
ALLISTER L. BAKER

ATTORNEY

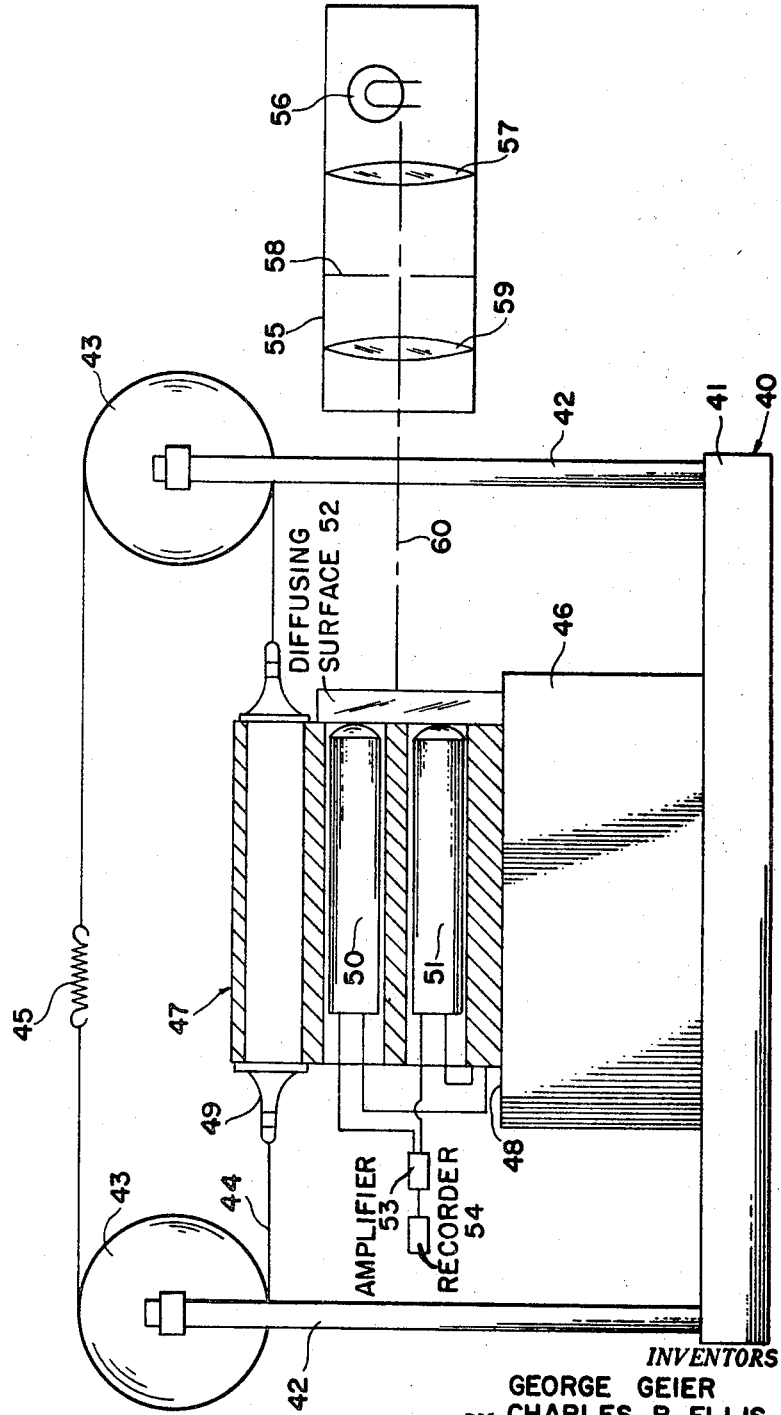

United States Patent Office 3,406,292
Patented Oct. 15, 1968

3,406,292
SURFACE CHECKING DEVICE
George Geier, Teaneck, Charles R. Ellis, Andover, and Allister L. Baker, Denville, N.J., assignors to Keuffel & Esser Company, Hoboken, N.J., a corporation of New Jersey
Original application July 17, 1961, Ser. No. 124,511, now Patent No. 3,220,113, dated Nov. 30, 1965. Divided and this application Feb. 10, 1965, Ser. No. 440,980
5 Claims. (Cl. 250—224)

ABSTRACT OF THE DISCLOSURE

A surface checking device for measuring surface projections and indentations in a direction perpendicular to the surface being checked by means of an optical system directed to a photoelectric sensing system in which either the optical system or the photosensitive system are moved in a direction perpendicular to the surface being checked with object engaging means connected to one of the optical system or the photosensitive system to deflect the corresponding system to thereby determine the surface characteristics of the object.

---

This application is a division of application Ser. No. 124,511, filed July 17, 1961, and which has resulted in Patent No. 3,220,113, issued Nov. 30, 1965.

This invention relates to surface and cavity checking devices, and refers more particularly to means for measuring and recording variations in one or more surfaces or cavities.

In prior art there have been some attempts to check variations of surfaces particularly as respects the curvature of gun barrels. Some of the prior art attempts included running a mirror through a gun barrel and reflecting auto-collimated light off the mirror to determine barrel curvature or variation. In general however the prior art devices have not achieved the accuracy required to check surface variations in modern high precision industries and other fields.

An object of the present invention is to provide a surface checking device not having the disadvantages of prior art.

Another object is to provide a surface checking device for measuring and recording the variation in one or more surfaces to a high degree of precision.

Another object is to provide a checking device for checking and recording the variations in a slot or other type of cavity.

Another object is to provide an electro-optical device for determining and recording the variations in one or more surfaces and cavities.

Other objects of the present invention will become apparent in the course of the following specification.

The objects of the present invention may be realized through the provision of a surface checking device or cavity checking device having electro-optical means for checking and recording the variations in one or more surfaces or cavities. The electro-optical means comprise contacting means for contacting the one or more surfaces to be checked, the contacting means being disposed in a path of light between the light source and a photosensitive electro-means such as photocell means. As the contacting means encounters variations in the surface or surfaces which it contacts, it undergoes movement or change of shape which are a function of the surface variation. This movement or change of shape of the contact means results, either directly or through intermediate means, in deviation in the path of the light falling on the photocell means or in a change in the intensity of light falling on the photocell means, either of which are then functions of the surface variations. Electronic amplifying and indicating means connected to the photocell means make available the data as to the surface or cavity variations, whereby the surface or cavity variations are determined.

The present invention may be used to determine variations either on external or internal surfaces, and to determine changes in dimension of slots, cavities and the like.

The invention will appear more clearly from the following detailed description when taken in connection with the accompanying drawings showing, by way of example, preferred embodiments of the inventive idea.

In the drawing:

FIGURE 3 is a side view partly schematic and partly in section of another embodiment of the present invention; and FIGURE 4 show a sphere-type prober connected to the embodiment of FIGURE 3.

Figure 1:
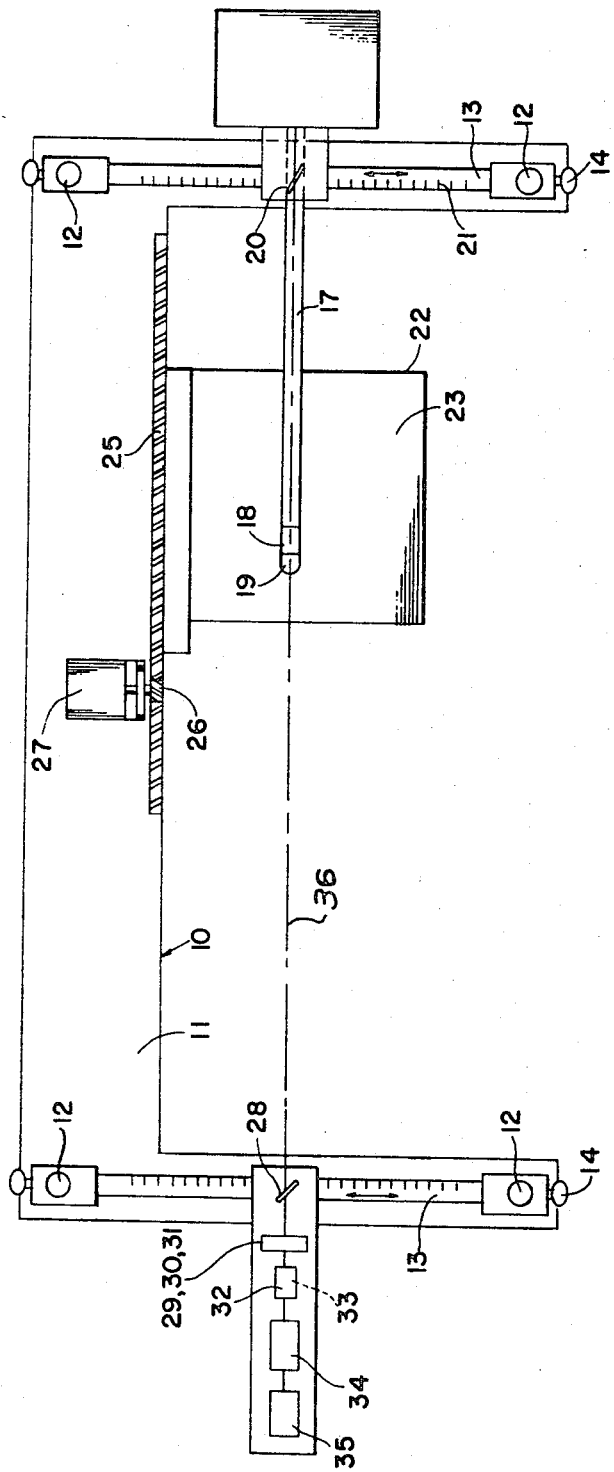
FIGURE 1 is a plan view partly schematic of a surface checking device of the present invention.
Figure 2:
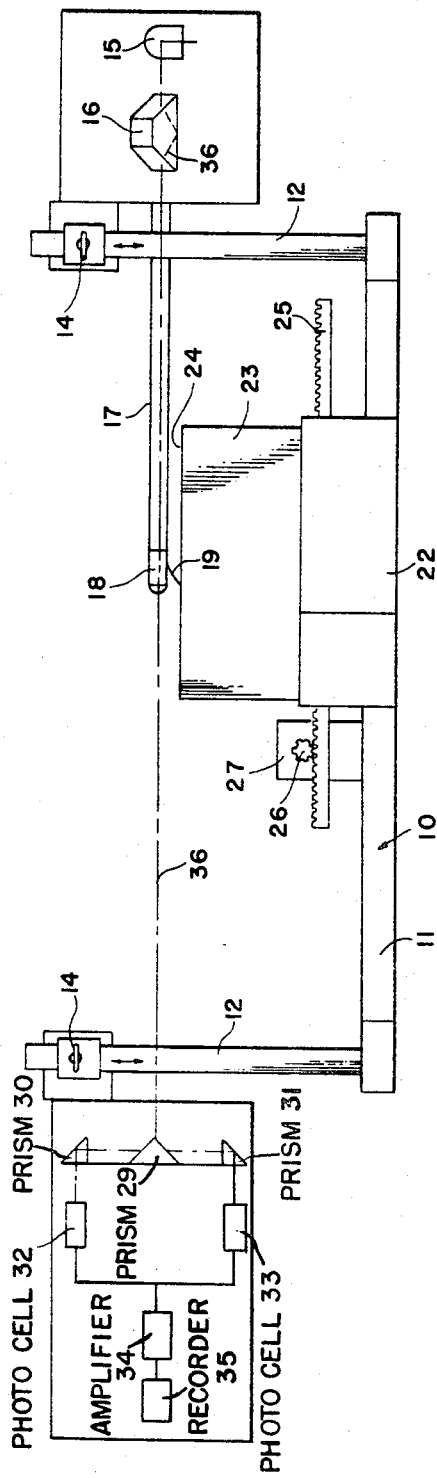
FIGURE 2 is a side view partly schematic of the device of FIGURE 1.

An embodiment of the present invention is shown in FIGURES 1 and 2 and comprises a frame 11, four upright members 12 connected to frame 11, and two horizontally disposed bars 13 which are movable vertically on members 12 and which can be fixed at any height by means of thumb screw 14 or the like. A light source 15 comprising a single ribbon filament incandescent lamp, a dove prism 16 or other means for rotating the image of the filament of light source 15 through 90° and a light variation contact means such as spring loaded probe tube 17 having a converging lens 18 a sensing finger 19 at one end are connected to a bar 13 so as to be movable along bar 13 or fixed in any selected position by thumb screw 20 at a point indicated by graduations 21. These members are so disposed with respect to one another that the image of the vertical filament of light source 15 passes through dove prism 16 is rotated 90° into a horizontal position and passes through probe tube 17 and through converging lens 18. The sensing finger 19 is preferably of a highly polished metal so that the work surface with variations ought to be checked will not be scratched.

A work piece support or gage block 22 supports work piece 23 whose surface 24 in this case is to be checked for variations. Rack 25 and pinion 26 move the work piece horizontally so that the sensing finger 19 is in contact with surface 24 along a selected line. Pinion 26 is connected to potentiometer 27 so that it is possible to determine at any given instant the relative location of a sensing finger 19 with respect to the work piece 23 and its surface 24 the potentiometer 27 may be connected directly to a readout and recording means for correlating the surface variations determined with the dimensions of the work piece 23. Connected to the second horizontal bar 13 and movable horizontally thereon, and being able to be fixed selectively thereon by means of thumb screw 28 is a silvered prism 29 and prisms 30 and 31 disposed above and below prism 29 and photocells 32 and 33 (photomultipliers may be used where desired). The photocells 32 and 33 are electrically connected in the form of a bridge, such as a Wheatstone bridge, to amplifier 34 which in turn is connected to an indicator, meter, and recorder 35 or the like.

The manner and use of operation of the embodiment 10 of the present invention is as follows:

The problem which the present invention seeks to solve is the measuring and recording of the contour of a surface, either external or internal, to a very high degree of accuracy.

The embodiment 10, for example, measures surface contour by converting surface contour displacement into displacement of a light beam and measuring the displacement of the light beam by photoelectric means. The light source 15 is a single ribbon filament incandescent lamp which must be operated with the filament in a vertical position in order to prevent the filament from distorting when lit. If the filament is held at a horizontal angle for example, its own weight will cause distortions during heat up. A beam of light 36 is emitted from light source 15 as a vertical beam of light and passes through dove prism 16 which is disposed at an angle of 45° with respect to the vertical filament whereby the dove prism 16 rotates the image of the filament through an angle of 90° thus producing a horizontal image.

It should be noted that the single ribbon filament light source 15 and dove prism 16 may be replaced by another light source behind an optical slit.

After the horizontal light beam 36 leaves dove prism 16 it passes through probe tube 17 which is rigidly connected to the means supporting the light source 15 and dove prism 16 so that all three members move together. The probe tube 17 is spring loaded against the surface 24 and work piece 23 whereby as the rack 25 and pinion 26 move the work piece 23 the sensing finger 19 follows the contour of surface 24 thus causing the sensing end of probe tube 17 and converging lens 18 to be moved vertically and proportionately to the surface variations encountered in surface 24. Therefore, the beam of light 36 will pass through different portions of converging lens 18 depending upon the variations in surface 24. The converging lens 18 focusses the horizontal image of the lamp filament of light source 15 on the edge of the silvered prism 29. This edge divides the image into two parts, i.e., that part which is above the edge and that part which is below the edge. These two parts of the image are directed by two other prisms 30, 31 to illuminate photocells 32, 33, these two photocells are connected as two legs of a Wheatstone bridge, or any other suitable bridge configuration, and the output of this bridge is proportional to the difference in the amount of light which falls upon the two photocells 32, 33. This output signal is amplified in amplifier 34 and is indicated and recorded on the indicator device, meter device, or recorder 35.

As the work piece 23 is moved beneath the sensing finger 19 the vertical deviation in the surface 24 of the work piece 23 cause sensing end of the probe tube 17 to move through the same vertical deviations and thus the converging lens 18 follows the deviations in the surface 24. As this lens 18 moves it causes the image of the light source filament to move across the edge of the silvered prism 29 which in turn varies the ratio of illumination on the upper and lower photocells 32 and 33. This provides the output from the bridge which is proportional to the vertical displacement of the surface 24, and this image output is then amplified and indicated on a meter or recorder.

The location of the sensing finger 19 along the length of the work piece 23 is measured by a potentiometer 27 which is geared to work piece 23 by a rack 25 and pinion 26 as shown. This potentiometer 27 provides abscissa information. When the output of the photocell bridge is plotted on one axis (Y-axis) and the output of the potentiometer 27 is plotted on the other axis (X-axis) on an X-Y recorded, the surface contour of the work piece will be drawn to scale. Thus the curve is achieved which is a scale representation of the surface contour along the line on which the sensing finger 19 moves across the surface 24.

Since the light source 15 and probe tube assembly 17 on the one hand and prism and photocell assembly on the other hand may be moved vertically and horizontally any work piece can be accommodated and the probe sensing finger 19 can be moved across the work piece along a series of parallel lines and if the zero of the plotting device is shifted accordingly then a family of curves will be drawn which will be a scale representation of the surface 24 as seen isometrically. The angle of viewing may be adjusted by controlling the zero adjustment between the passes of the probe.

Gage blocks are available with non-surface deviations for testing the device.

The rate at which the work piece 23 can be moved passed sensing finger 19 is governed by the response to changes in light of the photocells and therefore if photomultipliers are used a faster work rate may be achieved.

Of course, a plurality of probe assemblies and prism and photocell assemblies may be mounted in alignment on bars 13 thereby simultaneously determining the surface variations along a series of parallel lines. If desired, it is also possible to move the probe device and photocell device along the bars 13 while the work piece is moving in contact with sensing finger 19 thereby determining variations along a diagonal line on surface 24.

The output sigals (X and Y) are direct analogs of the surface 24. With the introduction of an object analog cross feed, a three dimensional scale representation is obtained. Such scale drawings can be plotted either ortographically or isometrically. These drawings could be plotted in Cartesian, polar, or cylindrical coordinate.

This technique can also be used differentially with the present invention to show the difference between the lines, surfaces, or filaments and would yield direct readings of deviations from a standard unit. This type of measurement is extremely useful for checking nonlinear surfaces against a reference.

The output of the present invention may be digitalized in any or all planes, and printed outputs of surface contours can be produced. Such outputs can show either absolute or different dimensions, that has physical measurements or deviations or a desired dimension or surface. The output can also be used to contour images which generate or correct specific pieces.

Of course, photocells 32 and 33 may be replaced by a single photocell if suitable optical means are supplied to have both light beams pass through a light chopper device so as to alternately fall upon the single photocell, thereby giving a readout in the indicator means of the surface variations. Special photocells are available not requiring dividing edges.

Another embodiment 40 of the present invention is shown in FIGURE 3 and comprises a mounting base or frame 41, and vertical mounting rods 42 rigidly connected to mounting base 41 and supporting pulleys 43, and a wire 44 passing over both pulleys 43 and having a low tension spring 45 therein. A workpiece 46 is shown being engaged by the probe or sensing unit 47 which rests on the workpiece surface 48 whose variations are to be determined.

The probe or sensing unit 47 comprises a swivel guide rod 49 to which at each end is attached wire 44 for moving the entire probe or sensing device 47 over the surface 48 of workpiece 46. The sensing unit 47 also comprises two photo-cells 50 and 51 which are disposed in openings in the sensing unit 47. A diffusing surface 52 such as milk-glass is mounted perpendicular to the photo-cell axes. The diffusing point on the milk-glass 52 is equally spaced between the heads of the photo-cells 50–51.

Both photo-cells 50–51 have one lead soldered to the probe 47 and the other connected to an amplifier 53 which is a conventional DC vacuum tube amplifier, the amplifier 53 in turn being connected to an indicator, meter, or recorder 54.

A self-focusing telescope 55 which contains a light source 56, a condenser lens 57, a slit target 58 and objective lens 59 is disposed in alignment with the diffusing surface 52.

The embodiment 40 of the present invention is an optical probe equipped with a self-focusing telescope and is used to measure, by photoelectric means, the level variations of a surface with respect to a fixed beam of light.

The manner of operation and use of embodiment 40 of the present invention is as follows:

The probe 47 slides on the surface 48 to be measured by means of wire 44 and pulleys 43 together with any motive force which is convenient. Since the surface of the probe 47 coming in contact with surface 48 is a flat surface and not a point surface, this particular embodiment as shown would measure level variations over a particular distance rather than minute surface variations at each particular point. The swivel guide 49 permits the probe 47 to be pulled across surface 48 while still allowing the probe 47 to follow the contour of the surface 48.

Light from light source 56 in self-focusing telescope 55 passes through the converging lens 57, through the optical slit 58 and through the objective lens 59 and this beam of light 60 which has illuminated the slit target 58 after leaving light source 56 and passing through condenser lens 57, projects the slit target through the objective lens 59 and on to the diffusing surface or milk-glass 52. Since the diffusing point on the diffusing surface or milk-glass 52 is equally spaced between the heads of the photocells 50–51, the beam or light 60 is divided into two beams of equal light intensity and these two beams are picked up by the two photo-cells. However, since the probe 47 slides on surface 48, which has irregularities, a change in the level of the surface 48 with respect to the optical axis of the self-focusing telescope 55, thus will increase light intensity on the one photo-cell and decrease it on the other depending on whether the light beam falls on the diffusing surface 52 closer to one or the other of the photo-cells. The signals generated by the two photo-cells 50, 51 are compared in the amplifier 53 and the different signal is transmitted to the indicator 54 for display. It has been found that photo-cells of diameter .080" will serve this purpose well and such photo-cells or the like are commercially available.

The probe 47 is connected to the amplifier ground by means of the swivel guide rod 49, and the galvanized wire 44, pulleys 43, and mounting rods 42.

The amplifier 53 can be a transistorized differential amplifier, and the indicator can be a micro-ammeter or the like. The indicator 54 may be calibrated by measuring a surface of known variation.

If it is desired to measure point variations on surface 48 with the embodiment 40 of the present invention, a spherical member 61 may be attached to the lower surface of probe 47 as shown in FIGURE 4. The operation of the embodiment of FIGURE 4 is then the same as that of FIGURE 3.

Among the advantages of the present invention are that it is much more convenient, much more accurate, and easier and faster to use than any prior art device.

It is apparent that the described examples are capable of many variations and modifications within the scope of the present invention. All such variations and modifications are to be included within the scope of the present invention.

What is claimed:
1. A surface checking device comprising:
 (a) surface-contacting means arranged to provide a surface-normal displacement as a function of irregularities in said surface;
 (b) a light image source;
 (c) optical means for focusing a light image from said source at a focal plane;
 (d) image-dividing means located at said focal plane and disposed to divide said light image at a line in said plane, said line being transverse to said surface-normal displacement;
 (e) one of said optical means and image-dividing means being arranged for surface-normal displacement in conjunction with said contacting means displacement; and
 (f) light-responsive means disposed to receive the respective parts of the divided light image and to compare the amounts of light constituting such respective image parts, thereby to establish the displacements of said surface-contacting means and thus the irregularities of said surface.

2. A surface checking device according to claim 1 wherein:
 (a) said image-dividing means comprises a surface-reflecting prism, the apex of said prism being located at said transverse line; and
 (b) said light-responsive means comprises a pair of photo-electric cells.

3. A surface-checking device according to claim 1 wherein said image-dividing means comprises a light-opaque partition edgewise disposed at said focal plane and wherein said light-responsive means comprises (a) a pair of photo-electric cells disposed at said focal plane and on respective sides of said partition, and (b) electrical circuitry in circuit with said cells and capable of comparing signals generated by said cells.

4. A surface-checking device according to claim 1 wherein said optical means is coupled with said surface-contacting means and is thereby capable of displacing said light image in said focal plane in conjunction with said surface-normal displacement of said surface-contacting means.

5. A surface-checking device comprising:
 (a) a surface-contacting means arranged to provide a surface-normal displacement as a function of irregularities in said surface;
 (b) a light image source;
 (c) optical means for focusing a light image from said source at a focal plane; and
 (d) light-responsive means coupled with said surface-contacting means for displacement in conjunction therewith and situated at said focal plane to receive said light image, said light-responsive means comprising:
  (1) a plurality of photo-electric cells arranged in linear array in the plane of said displacement, and
  (2) electrical circuitry in circuit with said cells and capable of comparing signals generated by said cells, whereby displacement of said surface-contacting means and coupled light-responsive means presents more of one or another of said photocells to receive said light-image, thereby resulting in the generation of variously discernible electrical signals as a function of said surface irregularities.

References Cited
UNITED STATES PATENTS

| | | | |
|---|---|---|---|
| 2,048,154 | 7/1936 | Abbott et al. | 73—105 |
| 2,510,347 | 6/1950 | Perkins | 250—219 |
| 2,958,786 | 11/1960 | Millis | 250—231 X |
| 2,967,947 | 1/1961 | Flook | 250—219 |

WALTER STOLWEIN, *Primary Examiner.*